May 26, 1970

C. L. V. LAMARE 3,513,560

METHOD IN DRYING HYDROUS SOLID MATERIAL AND THE
SUBSEQUENT HEAT TREATMENT OF THE DRIED MATERIAL

Filed March 4, 1968

CHARLES LOUIS VIEL LAMARE
INVENTOR.

BY Albert M. Parker
ATTORNEY.

3,513,560
METHOD IN DRYING OF HYDROUS SOLID MATERIAL AND THE SUBSEQUENT HEAT TREATMENT OF THE DRIED MATERIAL

Charles Louis Viel Lamare, Taby, Sweden, assignor to Aktiebolaget Celleco, Stockholm, Sweden, a corporation of Sweden
Filed Mar. 4, 1968, Ser. No. 710,271
Claims priority, application Sweden, Mar. 2, 1967, 2,849/67
Int. Cl. F26b 3/08, 7/00
U.S. Cl. 34—10      4 Claims

ABSTRACT OF THE DISCLOSURE

A method for further utilizing the heat content of gases used in drying hydrous material in a fluidized bed for heat treatment of the dried material. The material is first dried in a fluidized bed and then transferred to a separate chamber where it is indirectly heated by the same stream of gases used for fluidizing. An economically short period of retaining the material in the bed is thus realized.

---

The present invention is concerned with drying of hydrous solid material by means of a fluidized process, that is to say by direct supply of heat, while arranging for a stream of hot gas (drying gas) to flow through a fluidized bed. The invention relates to an economically advantageous method of utilizing the heat contents of the drying gas to treat the solid material for a treatment period which is considerably longer than the time needed solely to dry the solid material when utilizing said process.

The disadvantage of using the fluidizing principle in this connection is that while this principle is well suited both economcally and with regard to its efficiency in intensive treatment processes, that is to say when effecting a high degree of reaction or conversion during a short period of stay of the material in the fluidized bed, it becomes progressively less economic the longer the material is retained in the bed, for example by increasing the volume of the bed. The reduction in the economical advantages of this process is mainly due to the fact that the energy taken to maintain the fluidized bed for a predetermined period of time greatly increases in relation to the treatment effect, the resul being all too high operation costs. Consequently, generally it is not suitable to apply the fluidizing process so as to cause the material to be dried to remain in the bed during the whole of this prolonged treatment period.

An example of a particularly preferred embodiment of the invention is drying of sewage products (for example sludge from settling tanks, crude sludge and similar effluents) in a dryer, whereby the effluent, in order to be obtained in a dry, disinfected condition is to be maintained for about twenty minutes at a temperature of about 100° C., while the drying process proper, effected at about 110° C. for instance, can—and should—be completed in a much shorter time. These conditions can also be applied when drying, for instance, medicaments, animal foods and fertilizers.

Figure 1:
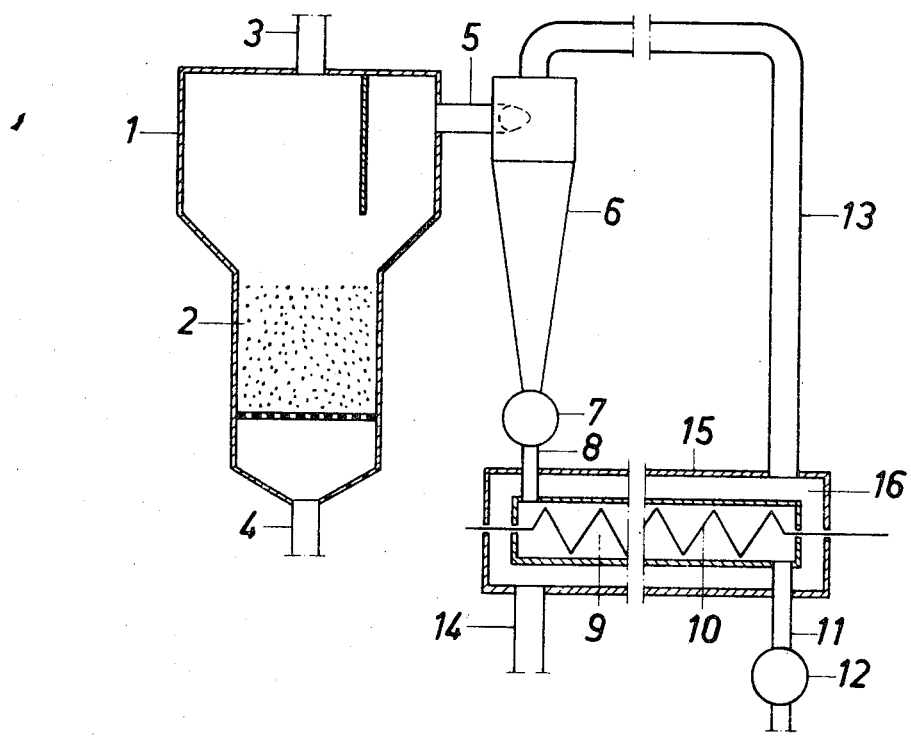
Figure 2:
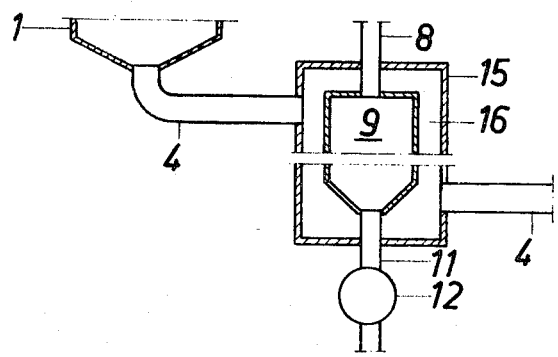
Figure 3:
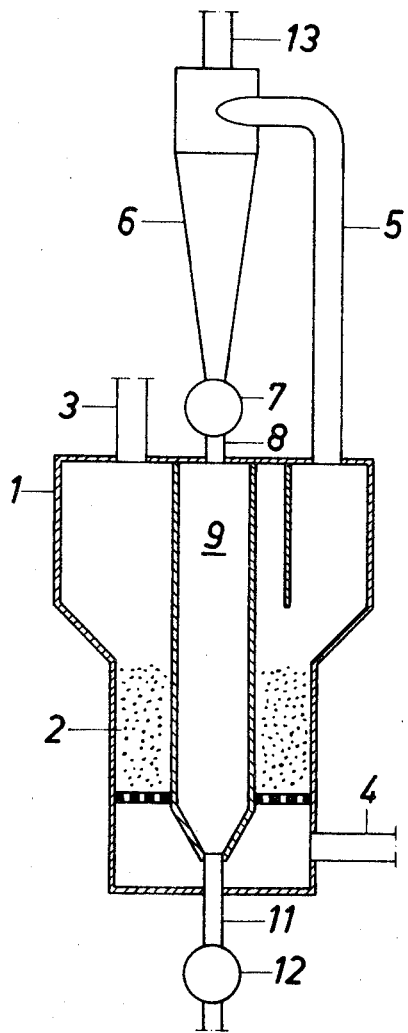

The invention will now be described in detail with reference to the accompanying drawing, in which each of FIGS. 1, 2 and 3 illustrate diagrammatically and by way of example a modification of an arrangement for applying the invention. Identical details in the figures are identified by the same reference numerals.

FIG. 1 illustrates a dryer 1 enclosing a fluidized bed 2, comprising a material other than the material to be dried. An inlet 3 is provided for supplying the hydrous solid material, an inlet 4 is provided for hot gas, for example hot air or flue gases, which are passed through the bed as fluidizing gas therefor in contact with the supplied material, so as to evaporate and entrain the water content of said material, whereafter the gas together with the dried material is discharged to a cyclone separator 6 through a conduit 5. The dried material is separated from the drying gas in the cyclone 6 and flows therefrom through a discharger or gate valve 7 and an outlet 8 to one end of a horizontal heat treatment chamber 9, through which it is fed by means of a feed screw 10 for a period of time adjusted to the final phase of the heat treatment step, and subsequently the material is discharged from the system through an outlet 11 having a discharger or gate valve 12. During the course of these proceedings the chamber 9 is heated by the drying gas flowing from the cyclone 6 through discharge conduit 13 to a chamber 16 defined by a casing 16 around the heat treatment chamber 9 and out of chamber 9 through discharge conduit 14.

FIG. 2 illustrates a modified system, in which the heat treatment chamber 9 is upright so as to allow the dried material to pass by virtue of its gravity through said chamber 9, either continuously or intermittently, during a period of time controlled by the discharger or gate valve 12, and in which the chamber 16 around said chamber 9 communicates with the outlet conduit 4 for the drying gas to the dryer instead of communicating with the discharge conduit 13 for the drying gas from the same, the discharge conduit 14 in this case being superfluous. In this manner it is possible to heat-treat the dried material at higher temperatures than in the previous instance.

In the modification shown in FIG. 3 a heat treatment chamber 9 according to FIG. 2 is located within the dryer proper, surrounded by the fluidized bed and thus heated by the drying gas whilst it flows through said bed, whereby the heating effect is amplified.

What I claim is:

1. In a method in drying hydrous solid material and subsequently heat treating the dried material by supplying heat from one and the same stream of hot gas, the combination of first causing the hydrous material to remain in said stream of gas in a bed of other solid particles, fluidized by means of said gas, for a period of time not substantially exceeding the time required solely to dry the material, separating said material from said gas, and subsequently causing the material thus dried to remain for a sufficient period of time for the subsequent heat treatment of said material in a heat treatment chamber, separately from said fluidized bed and the stream of hot gas, said chamber being heated indirectly by means of said gas.

2. The method according to claim 1 including effecting the separation of said gas from said material by cyclone separation.

3. The method of claim 1 including advancing said material through said heat treatment chamber in a generally horizontal direction.

4. The method of claim 1 including removing said material and said gas together from said bed prior to separating said material from said gas.

References Cited
UNITED STATES PATENTS

| | | | |
|---|---|---|---|
| 2,926,428 | 3/1960 | Adam et al. | 34—17 |
| 3,313,035 | 4/1967 | Crawford et al. | 34—57 |
| 3,360,866 | 1/1968 | Shirai | 34—57 |

KENNETH W. SPRAGUE, Primary Examiner

U.S. Cl. X.R.
34—17